(12) United States Patent
Bammi et al.

(10) Patent No.: US 11,823,133 B1
(45) Date of Patent: Nov. 21, 2023

(54) CORE DECISION ENGINE FOR MANAGING SOFTWARE DEVELOPMENT LIFECYCLES

(71) Applicant: CITIBANK, N.A., New York, NY (US)

(72) Inventors: Shweta Bammi, Haryana (IN); Balaji Kobula Madhavan, Prosper, TX (US); Robin J. Kurian, Carrollton, TX (US)

(73) Assignee: CITIBANK, N.A., New York, NY (US)

( * ) Notice: Subject to any disclaimer, the term of this patent is extended or adjusted under 35 U.S.C. 154(b) by 0 days.

(21) Appl. No.: 18/141,018

(22) Filed: Apr. 28, 2023

(51) Int. Cl.
*G06F 15/16* (2006.01)
*G06Q 10/10* (2023.01)
*G06Q 10/107* (2023.01)
*G06Q 10/101* (2023.01)

(52) U.S. Cl.
CPC ......... *G06Q 10/103* (2013.01); *G06Q 10/101* (2013.01); *G06Q 10/107* (2013.01)

(58) Field of Classification Search
CPC ... G06Q 10/101; G06Q 10/103; G06Q 10/107
USPC ....................................................... 709/206
See application file for complete search history.

(56) References Cited

U.S. PATENT DOCUMENTS

| | | | |
|---|---|---|---|
| 7,337,124 B2 * | 2/2008 | Corral .............. | G06Q 10/06313 705/7.17 |
| 7,509,626 B1 * | 3/2009 | Barnes ................ | G06F 11/3672 705/7.41 |
| 2008/0263505 A1 * | 10/2008 | StClair ...................... | G06F 8/10 717/106 |
| 2012/0159420 A1 * | 6/2012 | Yassin ................. | G06F 11/3672 717/101 |
| 2013/0254737 A1 * | 9/2013 | Lal .......................... | G06Q 10/06 717/101 |
| 2019/0104047 A1 * | 4/2019 | Tejaprakash ............ | H04L 43/50 |

\* cited by examiner

*Primary Examiner* — Imad Hussain
(74) *Attorney, Agent, or Firm* — Foley & Lardner LLP (57) ABSTRACT

Presented herein are systems and methods for tracking and verifying software capabilities. A method may include obtaining, by a computer from a reporting database, a set of project requirements associated with a software under development, the set of project requirements replicated from a project database to the reporting database, obtaining, from the reporting database, a set of testing results generated by a test program applied to code of the software under development, the set of testing results replicated from a testing database to the reporting database, extracting, from the reporting database, each project requirement associated with the software under development and each testing result generated for the code of the software under development, the computer extracting each project requirement and each testing result according to a set of mapping pre-configurations, and generating an email message combining the project requirement and the testing result to transmit to a set of recipients.

20 Claims, 4 Drawing Sheets

300

- 310: Obtain a set of project requirements associated with a software under development, the set of project requirements replicated from a project database to the reporting database
- 320: Obtain a set of testing results generated by a test program applied to code of the software under development, the set of testing results replicated from a testing database to the reporting database
- 330: Extract each project requirement associated with the software under development and each testing result generated for the code of the software under development, wherein the computer extracts each project requirement and each testing result according to a set of mapping pre-configurations
- 340: Generate an email message combining the project requirement and the testing result to transmit to a set of recipients

CORE DECISION ENGINE FOR MANAGING SOFTWARE DEVELOPMENT LIFECYCLES

TECHNICAL FIELD

This application generally relates to tracking software development projects, which may generally include project requirements for the software before development is complete.

BACKGROUND

Software development requires writing software code to meet various project requirements. Progress in a particular software development project may be based on how well the code-under-development satisfies project requirements. Conventional software testing programs may develop and apply test cases for testing and validating portions of the code and produce evidentiary documentation that software code was validated and satisfies the project requirements.

Currently, a software development lifecycle (SDLC) audit and review process requires development team members to manually review each project requirement, verify the project code against network testing portals during testing, and exchange approval emails to and from several managers.

Project Teams does have access to the evidence and the tools for generating the evidence. But the problem is Project Teams are not supposed to generate the evidence themselves, otherwise the Project Teams would be able to innocently or nefariously manipulate the codebase or other data used to generate the evidence. This creates trust shortfall in the validation processes by Auditors. This requires different individuals or Centralized Team to examine the test results, and prepare reporting information for the appropriate Projects.

SUMMARY

What is needed is an automated, centralized source of generating and distributing validation evidence of software-under-development meeting project requirements. Testing software that generates the evidence of whether a software develop project satisfies the project requirements could be generated using various testing software programs in an enterprise, but these testing programs do not track SDLC milestones or project requirements; nor do the testing programs generate robust reports from disparate data sources. In many conventional systems, the software testing tools used to generate the test cases are not designed to generate reports documenting the validation evidence or whether the code-under-development satisfies the project requirements. Project management software or issue management software could be configured or employed to capture and track the SDLC milestones and project requirements, but such management software does not configure, generate, or apply test cases for testing and validating the codebase; nor does such management software prepare robust reports from the disparate data sources with detailed information about test results. What is needed is a means of centralizing and leveraging the various components of a system for automated SDLC management and project requirements tracking; codebase testing; and generating the evidence documentation.

Embodiments described herein include systems, methods, and machine-readable executable instructions that may address the shortcomings described herein, and may provide any number of additional or alternative embodiments as well. Embodiments include a system having a various computing devices executing software programming for developing software, tracking and managing software development projects, testing and validating the software, and collaborating and reporting on the software development projects among enterprise users (e.g., developers, managers, auditors).

Embodiments may include hardware and software components hosting and executing a Core Decision Engine (CDE) system that addresses inefficiencies in managing software development lifecycle (SDLC) progress and milestones. Currently, the SDLC audit and review process requires development team members to manually go through each project requirement, verify the project against testing portals during testing, and exchange approval emails to and from several managers. The CDE automates many aspects of the SDLC audit and review process. The CDE leverages an extract-transform-load (ETL) network service hosted by devices on the enterprise system, where the ETL includes a software-based network-service platform (e.g., Ab Initio®, IBM InfoSphere DataStage®, Talend Data Integration®, AWS Glue®, Azure Data Factory®). The CDE may automatically collect relevant software development project information from several sources of the enterprise system, and disseminates updates to managers at preconfigured intervals or in response to preconfigured triggering conditions.

The CDE gathers project information from project management software (e.g., Jira®, Trello®, Asana®, Basecamp®), which tracks project requirements, milestones, and issues. The CDE also gathers testing results produced by testing software (e.g., Zephyr Enterprise®, Micro Focus ALM®). The CDE treats certain testing results as trusted and validated evidence of the project's compliance with the requirements.

Using the ETL service, the CDE extracts the relevant information from these data sources and dynamically constructs a reporting email based on the various inputs gathered from the project management software and the testing software. The reporting email includes details about the project's milestones and testing results, including the requisite evidence that the software complies with the project requirements. In addition to sending the emails, the CDE may also upload reporting email's content to a cloud storage.

Centralizing project information and testing results using the CDE and extracting the relevant information from the project information and testing results has the advantage of allowing for testing results from various different sources using various formats to be normalized and compared against the project information. In this way, the CDE may allow for comparison of various aspects of the software in the reporting email. Additionally, the CDE has the advantage of allowing for the use of various testing software having various reporting functions and formats. By generating the reporting email using information extracted from testing results, the CDE allows software development to continue unimpeded by changes in the identity of the various testing software. Furthermore, by gathering results produced by the testing software, the CDE provides the advantage of removing the requirement for developers to manually run testing software and report results. In this way, a zero-trust system is enabled, where developers do not have the opportunity to alter data in the testing results as they report the testing results.

Aspects of the present disclosure are directed to a computer-implemented method including obtaining, by a computer from a reporting database, a set of project requirements associated with a software under development, the set of project requirements replicated from a project database to the reporting database, obtaining, by the computer from the reporting database, a set of testing results generated by a test program applied to code of the software under development, the set of testing results replicated from a testing database to the reporting database, extracting, by the computer from the reporting database, each project requirement associated with the software under development and each testing result generated for the code of the software under development, where the computer extracts each project requirement and each testing result according to a set of mapping pre-configurations, and generating, by the computer, an email message combining the project requirement and the testing result to transmit to a set of recipients.

The method may further include updating, by the computer, a content of the email message with updated testing results. In the method, updating the content of the email message may include obtaining, by the computer from the reporting database a set of updated testing results, extracting, by the computer from the reporting database, each updated testing result of the set of updated testing results, and updating, by the computer, the content of the email message with the updated testing results. The method may further include generating, based on the project requirement and the testing result, a report including the project requirement and the testing result, and attaching, by the computer, to the email message, the report. In the method, the set of testing results may be generated by a plurality of test programs applied to the code of the software under development, where the plurality of test programs are each associated with one or more project requirements of the set of project requirements. The method may further include updating the set of mapping pre-configurations based on one or more updates to the plurality of test programs. In the method, the set of mapping pre-configurations may be configured to convert, for each respective test program of the plurality of test programs, the testing results of the respective test program from a first format of the respective test program to a second format of the email message. In the method, generating the email message may include generating a first version of the email message and a second version of the email message, wherein the second version includes less information than the first version. The method may include sending the first version to a first subset of the set of recipients and sending the second version to a second subset of the set of recipients. In the method, generating the email message may include generating the email message based on one or more functional configurations received, by the computer, in user input.

Aspects of the present disclosure are directed to a system including a processor, and a non-transitory, computer-readable medium including instructions which, when executed by the processor, cause the processor to obtain a set of project requirements associated with a software under development, the set of project requirements replicated from a project database to the reporting database, obtain a set of testing results generated by a test program applied to code of the software under development, the set of testing results replicated from a testing database to the reporting database, extract each project requirement associated with the software under development and each testing result generated for the code of the software under development, where the computer extracts each project requirement and each testing result according to a set of mapping pre-configurations, and generate an email message combining the project requirement and the testing result to transmit to a set of recipients.

In the system, the instructions may further cause the processor to update a content of the email message with updated testing results. In the system, updating the content of the email message may include obtaining, by the computer from the reporting database a set of updated testing results, extracting, by the computer from the reporting database, each updated testing result of the set of updated testing results, and updating the content of the email message with the updated testing results. In the system, the instructions may further cause the processor to generate, based on the project requirement and the testing result, a report including the project requirement and the testing result, and attach to the email message, the report. In the system, the set of testing results may be generated by a plurality of test programs applied to the code of the software under development, where the plurality of test programs are each associated with one or more project requirements of the set of project requirements. In the system, the instructions may further cause the processor to update the set of mapping pre-configurations based on one or more updates to the plurality of test programs. In the system, the set of mapping pre-configurations are configured to convert, for each respective test program of the plurality of test programs, the testing results of the respective test program from a first format of the respective test program to a second format of the email message. In the system, generating the email message comprises generating a first version of the email message and a second version of the email message, wherein the second version includes less information than the first version. In the system, the instructions may further cause the processor to send the first version to a first subset of the set of recipients and send the second version to a second subset of the set of recipients.

In the system, generating the email message may include generating the email message based on one or more functional configurations received in user input.

It is to be understood that both the foregoing general description and the following detailed description are exemplary and explanatory and are intended to provide further explanation of the embodiments described herein.

BRIEF DESCRIPTION OF THE DRAWINGS

The accompanying drawings constitute a part of this specification, illustrate an embodiment, and together with the specification, explain the subject matter of the disclosure.

DETAILED DESCRIPTION

Reference will now be made to the embodiments illustrated in the drawings, and specific language will be used here to describe the same. It will nevertheless be understood that no limitation of the scope of the disclosure is thereby intended. Alterations and further modifications of the features illustrated here, and additional applications of the principles as illustrated here, which would occur to a person skilled in the relevant art and having possession of this disclosure, are to be considered within the scope of the disclosure.

Current technological solutions do not include a centralized automated system, tool, or platform that performs various automated processes for tracking software development or generating evidences for software development. Embodiments described herein include systems and methods that perform these automated processes. The system may collect project requirements and testing results from a variety of sources, extract the project requirements and testing results, and generate a report combining the project requirements and the testing requirements. The report may be an email message and/or may be included in an email message which is automatically sent to a set of recipients. Advantages of the disclosed systems and methods include removing the requirement for developers to manually generate and report testing results, removing the opportunity for manipulation of data when reporting testing results, normalizing testing results from a variety of test programs, and providing consistent reports of software development progress regardless of the identity of the test programs used.

The disclosed systems and methods offer the advantage of removing the requirement for developers to manually generate and report testing results. Conventional systems require developers to manually run testing software, compare testing results from the testing software to project requirements, and manually report which project requirements are satisfied by the software being evaluated. This can be a time-consuming process, as various test programs may be designed to output testing results having various formats, information, and detail. Manually comparing these testing results to project requirements may be a time-consuming process which is prone to error, as the various formats of testing results may be difficult to compare to each other and the project requirements. The CDE automates this process by centralizing and consolidating testing results from various test programs. The CDE may extract the testing results according to a set of mapping pre-configurations which normalize the testing results so the testing results can be compared to each other and the project requirements. Furthermore, the CDE may extract the project requirements and the testing results according to the set of mapping pre-configurations such that the testing results are mapped to the project requirements. This allows the CDE to generate a report, such as an email message, combining the project requirements and the testing results in a way that shows a comparison of the project requirements and the testing results.

The disclosed systems and methods offer the advantage of removing the opportunity for manipulation of data when reporting testing results. Conventional systems which require developers to generate testing results and manually report the testing results, or a comparison of the testing results and the project requirements, allow the developers to manipulate the testing results or the comparison of the testing results and the project requirements in the reporting process. For example, a developer may be behind schedule in a software development project and may wish to over-report how many project requirements code of the software under development satisfies. When reporting the testing results or the comparison of the testing results and the project requirements, the developer may alter the number of reported project requirements satisfied by the code. In contrast, the CDE extracts the testing results from the set of testing results and reports the testing results without intervention from the developer, removing the opportunity for manipulation of the testing results when reporting the testing results. In this way, a zero-trust system is enabled, where a recipient of the report or email message combining the project requirements and the testing results does not need to trust the developer to be truthful.

The disclosed systems and methods offer the advantage of providing consistent reports of software development progress regardless of the identity of the test programs used. As discussed above, the CDE may extract the testing results and the project requirements according to a set of mapping pre-configurations, normalizing the project requirements and testing results for generating a report or email message combining the project requirements and the testing results. Extracting the project requirements and the testing results using the CDE allows for a variety of project requirement programs and/or test programs to be used while consistently generating reports or email messages combining the project requirements and the testing results. In this way, test programs may be added and/or swapped out for other test programs without changing the report or email message combining the project requirements and the testing results. In this way, the software development project is not restricted to specific test programs and/or specific vendors of test programs.

Figure 1A:
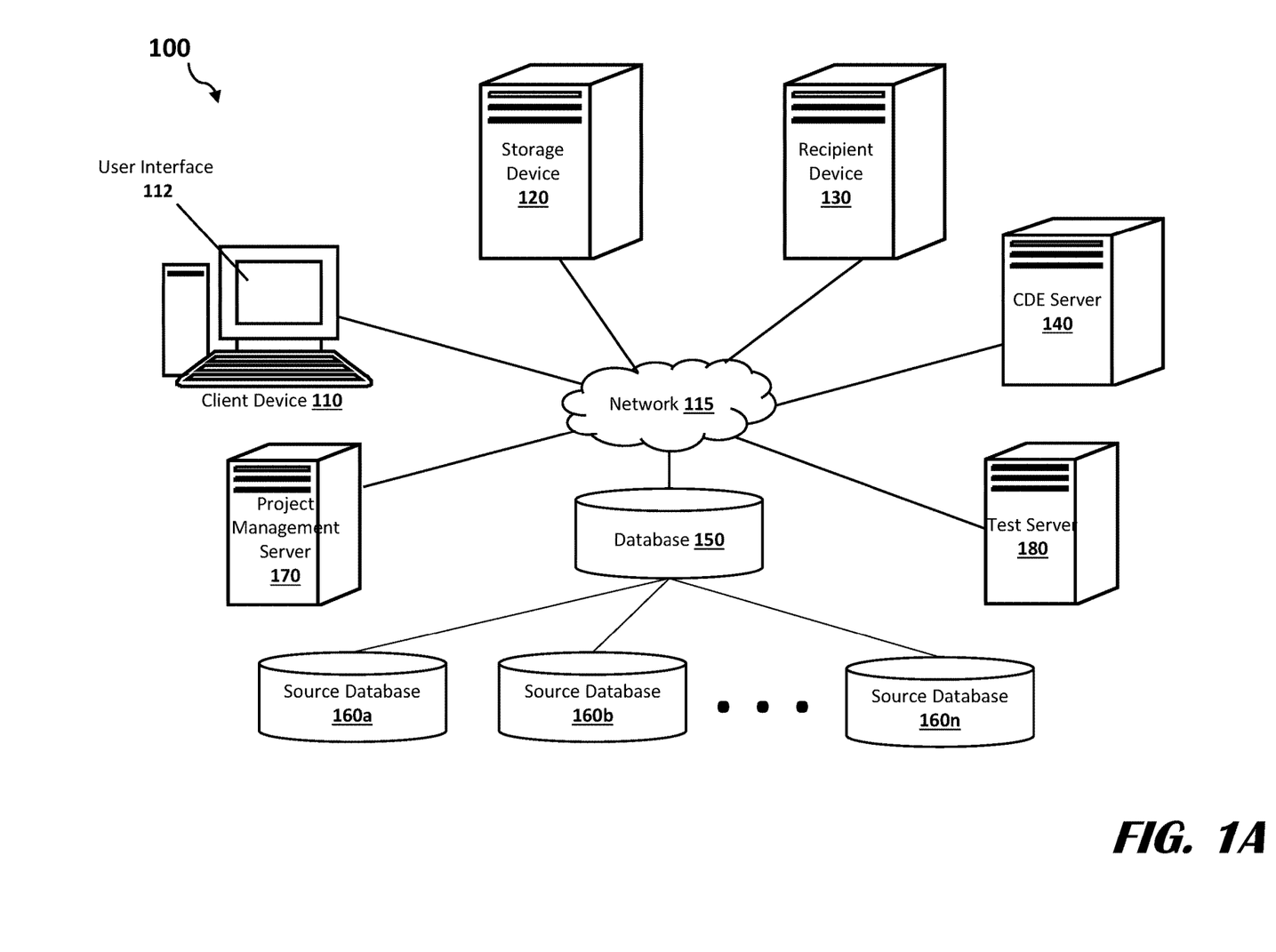
FIG. 1A is a block diagram of a network environment, in accordance with one or more embodiments.

FIG. 1A is a block diagram of a system 100 having various hardware and software components of a computing network environment, according to an embodiment. The system 100 includes a server hosting and executing a core decision engine (CDE server 140), a network 115, project management servers 170, test servers 180, a central database 150, and source databases 160*a*-160*n* (generally referred to as source databases 160 or a source database 160), including a project database 160*a* and a testing database 160*b*. The system 100 may include any number of client devices 110, a storage device 120, and a recipient device 130.

The system 100 includes one or more networks 115, which may include any number of internal networks, external networks, private networks (e.g., intranets, VPNs), and public networks (e.g., Internet). The networks 115 comprise various hardware and software components for hosting and conduct communications amongst the components of the system 100. Non-limiting examples of such internal or external networks 115 may include a Local Area Network (LAN), Wireless Local Area Network (WLAN), Metropolitan Area Network (MAN), Wide Area Network (WAN), and the Internet. The communication over the networks 115 may be performed in accordance with various communication protocols, such as Transmission Control Protocol and Internet Protocol (TCP/IP), User Datagram Protocol (UDP), and IEEE communication protocols, among others.

The CDE server 140 may execute programming for hosting the CDE software program (CDE 145 of FIG. 1B), and includes one or more computing devices configured to perform various processes and operates disclosed herein. The CDE server 140 may be a computer or computing device capable of performing methods disclosed herein. The CDE server 140 may include a processor and non-transitory, computer-readable medium including instructions, which, when executed by the processor, cause the processor to perform methods disclosed herein. The processor may include any number of physical, hardware processor.

The project management server 170 executes software programming for managing projects or issue resolution management program (e.g., JIRA®) that receives user inputs indicating the project requirements and, based on the user inputs, generates machine-readable code representing the project requirements. The project management server 170 may be any computing device having hardware and software components capable of performing the various processes and tasks described herein. An end-user operates the client device 110 to access and interact with the management software tool hosted by the project management server 170. The user enters the project requirements into the management tool and the project management server 170 stores the project requirements into the project management database 160a.

The system 100 includes one or more test servers 180 executing or otherwise hosting software programming for generating and executing test cases for validating portions of the code of the software-under-development, such as Micro Focus ALM® and Zephyr Enterprise®. A test server 180 may be any computing device having hardware and software components capable of performing the various processes and tasks described herein. In some cases, the test management tool executed by the test server 180 automatically generates test cases. Additionally or alternatively, the user enters user inputs configuring the test cases by accessing the test management tool using the client device 110. The test server 180 may generate and store the test cases into corresponding testing databases 160b.

The CDE server 140 may obtain, via the network 115, a set of project requirements associated with software under development from the central database 150 or the project database 160a. The set of project requirements may be functional requirements or development milestones for the software under development, such as required software features, compatibility with other software, security requirements, or other requirements. The set of project requirements may be replicated to the central database 150, over the network 115, from the project database 160a (or other source databases 160).

The client device 110 includes any computing device comprising hardware (e.g., processor, non-transitory storage media) and software components capable of performing the various processes and tasks described herein. The client device 110 includes software programming that enables the user to interact with the various software components of the system 100 via a user interface 112, such as the project management tool hosted by the project management server 170 or the testing management tool hosted by the test server 180. The client device 110 receives the user inputs indicating the project requirements and may transmit the set of project requirements to the project management server 170 and/or the project database 160a or other database of the system 100 via the network 115. The set of project requirements may include data records including the project requirements.

The CDE server 140 may obtain, via the network 115, a set of testing results from the testing database 160b (or other source database 160) having the set of testing results generated by the test server 180. In some cases, the testing database 160b replicates the set of testing results from the testing database 160b to the central database 150, and the CDE server 140 may query and retrieve the testing results from the central database 150. The test server 180 may execute the testing program that generates the set of testing results that generates executable instructions or scripts defining the test cases, which the test server 180 applies against the code of the software under development. The set of testing results may indicate functional behaviors of certain aspects or portions of the code (e.g., modules, methods, functions, calls, library imports, outputs, object instances, object classes, function parameters) in response to test cases applied to the code by the testing programs. The set of testing results may indicate, for example, whether the code passed or failed, or threw an exception, in response to the test cases executed by the testing programs as applied to the code. In some configurations, the aspects of the code tested by the one or more testing programs may correspond to the project requirements. The set of testing results may include data records including the testing results.

The central database 150 may store, for example, the set of project requirements and the set of testing results for reporting by the CDE server 140. Replicating the set of project requirements and the set of testing results to the central database 150 may have the advantage of not exposing the source databases 160 to the network 115 or the CDE server 140. This preserves a security of the source databases 160 while allowing the CDE server 140 access to the set of project requirements and the set of testing results. In some implementations, the set of project requirements and/or the set of testing results are replicated from the source databases 160 to the central database 150 via the network 115. In some implementations, the set of project requirements and/or the set of testing results are replicated from the source databases 160 to the central database 150 via a second network (not shown). The second network may be a WAN, LAN, or any other kind of network.

The CDE server 140 may extract the project requirements from the set of project requirements and the testing results from the set of testing results according to a set of mapping pre-configurations 149. The CDE server 140 may extract the project requirements and the testing results based on project parameters of the project requirements and/or test parameters of the testing results as discussed herein. The CDE server 140 may correlate the project requirements and the testing results. The CDE server 140 may generate a report file or email message 152 combining the project requirements and the testing results. The report or email message 152 may correlate the project requirements and the testing results as discussed herein.

The CDE server 140 may transmit the report or email message 152 to the recipient device 130 via the network 115. The recipient device 130 may be a computing device comprising hardware and software components capable of receiving and handling the outputs of the CDE server 140, such as servers hosting network application services (e.g., email server) or non-transitory network storage locations (e.g., cloud storage 151 hosted on storage device 120). In some embodiments, the recipient device 130 is a plurality of computing devices which receive the report or email message 152 from the CDE server 140 via the network 115. In some implementations, the recipient device 130 hosts software for an email server that receives, handles, routes an output email message 152 generated by the CDE server 140, where the email message 152 may include metadata addresses to a set of recipients associated with the email server hosted by the recipient device 130. The recipient device 130 may deliver the email message 152 to the addresses of the set of recipients according to an email or messaging protocol (e.g., SMTP).

The CDE server 140 may transmit the report or email message 152 to the storage device 120. The storage device 120 includes any number of computing devices comprising non-transitory machine-readable storage and software programming for hosting network storage locations accessible to the various computing devices of the system 100. In some embodiments, the storage device 120 may host or be integrated with the one or more system databases 150, 160 of the system 100. In some embodiments, the storage device 120 executes software programming for hosting a web-based cloud storage 151 location. The storage device 120 may be a virtualized computing resources hosting the cloud storage 151 location, such as an IBM Block Storage® or an AWS S3 Bucket®.

Figure 1B:
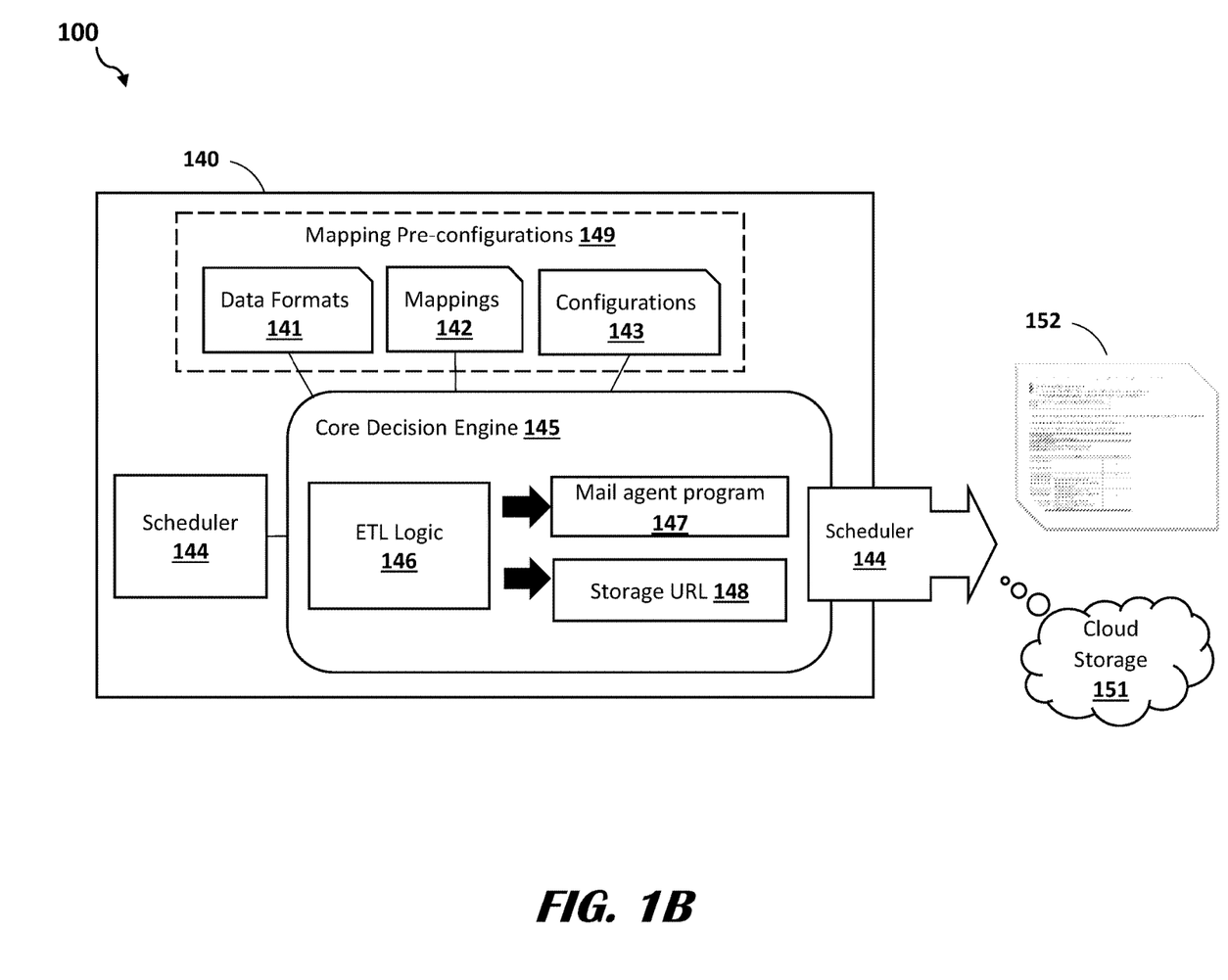
FIG. 1B is a block diagram showing details of the server of FIG. 1A, in accordance with one or more embodiments.

FIG. 1B is a block diagram showing details of the CDE server 140 of the system 100, in accordance with one or more embodiments. The CDE server 140 may include and execute the software programming for hosting the CDE 145 and performing the various functions and tasks described herein. The CDE 145 executes software routines for an extract-transform-load (ETL) software program or network service platform of the system 100, such as Ab Initio®. In operation, the CDE 145 may extract the project requirements and the testing results from the set of project requirements and the set of testing results stored in the central database 150 or source database 160, and generate a database record, report file, or email message 152 indicating the test results generated by the testing software of the system 100 relative to corresponding project requirements of the software-under-development.

The CDE 145 may extract the project requirements and the testing results and generate the report or email message 152 combining the project requirements and the testing results based on mapping pre-configurations 149. The mapping pre-configurations 149 may include data formats 141, mappings 142, and operational configurations 143.

The data formats 141 include machine-readable code indicating types of data or formatting standards for inputs or outputs of CDE 145 functions. The data formats 141 may further include software programming instructing the CDE 145 for enforcing or validating the formatting standards of the inputs and outputs. For example, the inputs may be the set of project requirements and the set of testing results, and the outputs may be the generated report or email message 152. During execution, the data formats 141 indicate, for example, that the CDE 145 functions expect and ingest the testing result input data in a string format and that the CDE 145 functions should prepare the email message 152 with numeric values having a floating point number format. In another example, the data formats 141 may indicate that the CDE 145 expects and ingests the testing results input data in, for example, a comma separated value (CSV) format and that the email message 152 includes data in table format.

In some cases, the data formats 141 and/or the mappings 142 may indicate and enforce one or more types of data or formatting standards according to certain project concepts, where a concept may refer to an aspect category or collection of one or more project requirements, desired features, or desired feature set of the code-under-development. Non-limiting examples of concepts of the software-under-development may include the graphical user interface features, reporting features, and application programming interfaces (APIs) or other data ingestion and validation features, among any number of functional features of the software-under-development. As an example, the concept may include authentication features of the code in which an identifier value is passed and/or queried through various programming components of the software-under-development. In this example, the data formats 141 (and/or mappings 142) may indicate and enforce a string format for an identifier object or function parameter across the various components that call or consume the identifier. As another example, the data formats 141 may indicate and enforce a number format (e.g., int, double, float) being adjacent to a string format for the various software components containing the features of the concept. In some cases, the CDE 145 may extract the testing result from the set of testing results based on the testing result having the format expected for the concept associated with the particular project requirement. In an example, the CDE 145 determines that a project requirement extracted from the set of project requirements is associated with a first concept and determines, based on the data formats 141 (or mappings 142), that the format of data in the testing result is associated with the first concept. In this example, the CDE 145 extracts the testing result associated with the project requirement from the set of testing results based on the type or formatting of the data in the testing result being associated with the first concept.

The data formats 141 may include executable programming routines for converting between types or formatting standards, which may include converting the input data from a first type or format to a second type or format, or converting the output data from a first type or format to a second type or format. For example, the data formats 141 may convert a string in the input test result to a floating point number in the output email message 152. In another example, the data formats 141 may convert a column structure in the input test result to a series of string text in the output email message 152. As another example, the data formats 141 may instruct the CDE 145 to maintain a column or table structure of the input test result when generating the output email message 152. As another example, the data formats 141 may convert a column structure of input test result to a row structure in the output email message 152.

The mappings 142 include machine-readable code that correlate or map the project requirements with corresponding testing results and/or with other components of the software-under-test (e.g., code containing the features of a concept, data types or formatting), thereby associating the project requirements with the testing results (or with the other components of the software). In some cases, the mappings 142 include information about the project requirements and/or the testing results, where such information may indicate the types of data or formatting standards of the project requirements or testing results, the testing parameters of the test cases (e.g., machine-readable code defining logic for generating the set of testing results), the testing results (which may include the machine-executable code containing the testing results or test cases), and the project requirements (which may include machine-executable code or pointers containing the project requirements), among others. In operation, the mappings 142 indicate to the CDE 145 the correlations between the test results from particular test cases of a plurality of test cases to the corresponding project requirements. Using the mappings 142, the CDE 145 extracts the test results from the source databases 160 (or central database 150) for the testing software and/or the corresponding project requirements from the source database 160 for the project management software (e.g., JIRA®).

As an example, the mappings 142 may map a connectivity test result to a connectivity project requirement that the code-under-development must successfully connect to a certain network (e.g., private network) or connect to the network according to one or more performance metrics (e.g., throughput, uptime). In this example, CDE 145 extracts as input the connectivity test result from the central database 150 or source database 160 in accordance with the project requirement indicated by the mappings 142. As another example, the mappings 142 may map a security test result security to a security project requirement that the code must provide a particular level of security (e.g., satisfies security metrics, operable with a certain encryption technology, authenticates users). The CDE 145 extracts the security testing result from the central database 150 or source database 160 in accordance with the project requirement indicated by the mappings 142. In some instances the mappings 142 maps a test result generated by a negative test case for validating a project requirement that the code maintain an existing state, function, or data structure, regardless of data updates or user inputs. As an example, the mappings 142 map a test result generated by a test case to a project requirement that the code maintain a current state when users enter alphabetic and special symbols or enter non-numerical symbols for a given entry form field. The test case may validate that the code maintains the current state and disallows users from entering alphabetic and special symbols for a given entry form field, thereby validating that the code permits only numeric symbols.

The CDE server 140 or other server of the system 100 may update the mappings 142 based on updates to the test case programming in the source database 160 for the testing software and/or the project requirements in the source database 160 for the project management software. In some implementations, the mappings 142 may map the test results to project requirements based on tags or other metadata in the test results, assigned by the CDE server 140 when the testing software generates the test results or when the test results are stored into the central database 150 or source database 160. In an example, the central database 150 or source database 160 contains the test result and a tag associated with a feature or set of features of the code, where the mappings 142 map the tag (of the test result) and/or the feature(s) to one or more project requirements. The CDE 145 may extract the test result based on the test result having the tag associated with the feature(s) and project requirement(s).

In some implementations, the mappings 142 may map the testing results and the project requirements to the concepts (e.g., code components for feature sets). The CDE 145 may extract a testing result and a project requirement f based on the testing result and the project requirement being mapped by the mappings 142 to a shared concept. In some implementations, the mappings 142 may map the testing results directly to the project requirements. The mappings 142 may map the testing results to the project requirements one-to-one, one-to-many, or many-to-one. For example, the mappings 142 may map multiple testing results to a single project requirement. In this way, the CDE 145 may quickly select and/or extract the requisite input data to generate the output email that indicates the status and validation of project requirements and/or concepts (e.g., feature sets) of the software-under-development.

The operational configurations 143 include software programming that instructs or configures the CDE 145 on extracting the project requirements and the testing results based on the data formats 141 and the mappings 142, according to various preconfigured circumstances or triggers. For example, the operational configurations 143 may determine whether the CDE 145 extracts the testing results based on the testing results being mapped to the project requirements in a test-to-requirement mode or whether the CDE 145 extracts the project requirements based on the project requirements being mapped to the testing results in a requirement-to-test mode. The operational configurations 143 may include one or more conditions for extracting the project requirements and the testing results. The operational configurations 143 may indicate that testing results which map to a project requirement are only extracted if they satisfy a condition. For example, the operational configurations 143 may indicate that testing results which map to a project requirement are only extracted if the testing results were generated within a specific timeframe.

The CDE 145 includes and executes programming of ETL logic 146, which may include an ETL software platform program (e.g., Ab Initio®), hosted and executed by the CDE server 140. The ETL logic 146 may take as inputs the various types of mapping pre-configurations 149 (e.g., data formats 141, mappings 142, operational configurations 143). The CDE 145 may use the ETL logic 146 to extract the project requirements and the testing requirements from the source database 160 for the project management software. The ETL logic 146 may indicate a source of extracted data, operations to be performed on the extracted data, and a destination of the extracted data. The ETL logic 146 may indicate that the CDE 145 extracts the project requirements and the testing results from the central database 150 of FIG. 1A based on the mapping pre-configurations 149. The ETL logic 146 may indicate that the CDE 145 generates the report or email message 152 combining the project requirements and the testing results. The ETL logic 146 may indicate that the CDE 145 generates the report or email message 152 combining the project requirements and the testing results based on the mapping pre-configurations 149. The ETL logic 146 may indicate that the CDE 145 sends the report or email message 152 to a mail agent program 147 or a storage URL 148. The mail agent program 147 may be an endpoint of a mail program associated with the recipient device 130 of FIG. 1A. In an example, the mail agent program 147 is an endpoint of a mail program of which the recipient device 130 is an email server. The storage URL 148 may be a URL of the storage device 120 of FIG. 1A. In an example, the storage URL 148 may be a URL of a cloud storage location of the storage device 120. The extracted testing results in the report or email message 152 may be used as evidence or evidences of the corresponding project requirements being satisfied.

The ETL logic 146 may indicate that the CDE 145 sends a first version of the report or email message 152 to the mail agent program 147 and a second version of the report or email to the storage URL 148. The ETL logic 146 may indicate that the CDE 145 sends the first and second versions of the report or email message 152 to the mail program 147 and/or the storage URL 148 based on predetermined conditions or thresholds (which may be indicated by the operational configurations 143), such as timing, a content of the message exceeding a predetermined threshold, and/or a version of the report or email message 152 previously sent to the mail program 147 and/or the storage URL 148.

In some implementations, a version of the report or email message 152 includes comparatively more information or more detailed information than another version of the report or email message 152. As an example, the first version is a complete version and the second version is a summary version. In another example, the first version is a complete version and the second version is a focused version including information associated particular project requirements. In another example, the first version is a summary version and the second version is a focused version. The ETL logic 146 may indicate that the CDE 145 sends the first and second versions to the mail agent program 147 such that the first version is sent to a first subset of recipients and the second version is sent to a second subset of recipients. For example, the first version is sent to a management team and the second version is sent to a quality assurance team. Although two versions are discussed here, multiple versions of the report or email message 152 may be generated having various levels of information and may be sent to various recipients and/or the storage URL 148 according to various rules.

The ETL logic 146 and/or the mapping pre-configurations 149 may be modified according to user input. In some implementations, the user input may be received at the user interface 112 of the client device 110 of FIG. 1A and transmitted to the CDE server 140. In an example, the user input modifies the operational configurations 143 such that the CDE 145 extracts the testing results based on the testing results being mapped to the project requirements in a test-to-requirement mode. In some implementations, the ETL logic 146 may include an ETL graph data structure that indicates and tracks dependencies between data, allowing users to modify the ETL logic 146 based on a visual representation of the ETL logic 146.

The CDE server 140 may execute software routines defining a scheduler 144. The scheduler 144 instructs the CDE 145 when to extract the project requirements and the testing results and when to generate the output report or message. In some implementations, the scheduler 144 may generate and manage an execution queue for handling multiple execution instances of the CDE 145 for any number of software development projects. In some implementations, the scheduler 144 may instruct the CDE 145 to execute the processes according to user-entered preconfigured intervals. The scheduler 144 instructs the CDE 145 to extract the project requirements and the testing results in batches at the preconfigured interval. In an example, the scheduler 144 causes the CDE 145 to extract the project requirements and the testing results every 4 hours or three times a day. In some implementations, the scheduler 144 instructs the CDE 145 to execute the processes according to preconfigured triggering conditions, such as updates entered and stored into one or more system databases 150, 160. The scheduler 144 may instruct the CDE 145 to extract the project requirements and the testing results each instance that a source database 160 receives data records (e.g., the project requirements, the testing results) or replicates the data records to the central database 150 of FIG. 1A.

The scheduler 144 may automate or instruct the CDE 145 to export or otherwise provide the outputs of the CDE 145 to one or more downstream software or hardware components of the system 100. As an example, the ETL logic 146 and other functions of the CDE 145 may generate the output data for the mail agent program 147, which may populate or otherwise generate the email message 152 using the outputs of the CDE 145. The scheduler 144 may instruct the CDE 145 to export the email message 152 to the recipient server 130 executing the software of the email application server, thereby prompting the recipient server 130 to transmit the email message 152 according to the email address(es). As another example, the ETL logic 146 and other functions of the CDE 145 may generate the output data as the report data, which may populate or otherwise generate the report using the outputs of the CDE 145. The scheduler 144 may instruct the CDE 145 to export the report to the storage URL 148 of the cloud storage 151 hosted on the storage device 120 of the system 100. The user may provide configuration inputs to the scheduler 144 that instruct the scheduler 144 to output to the one or more downstream components of the system 100 at a given interval, in response to triggering conditions (e.g., database updates), or in response to instructions received from the user or client device 110.

Figure 2:
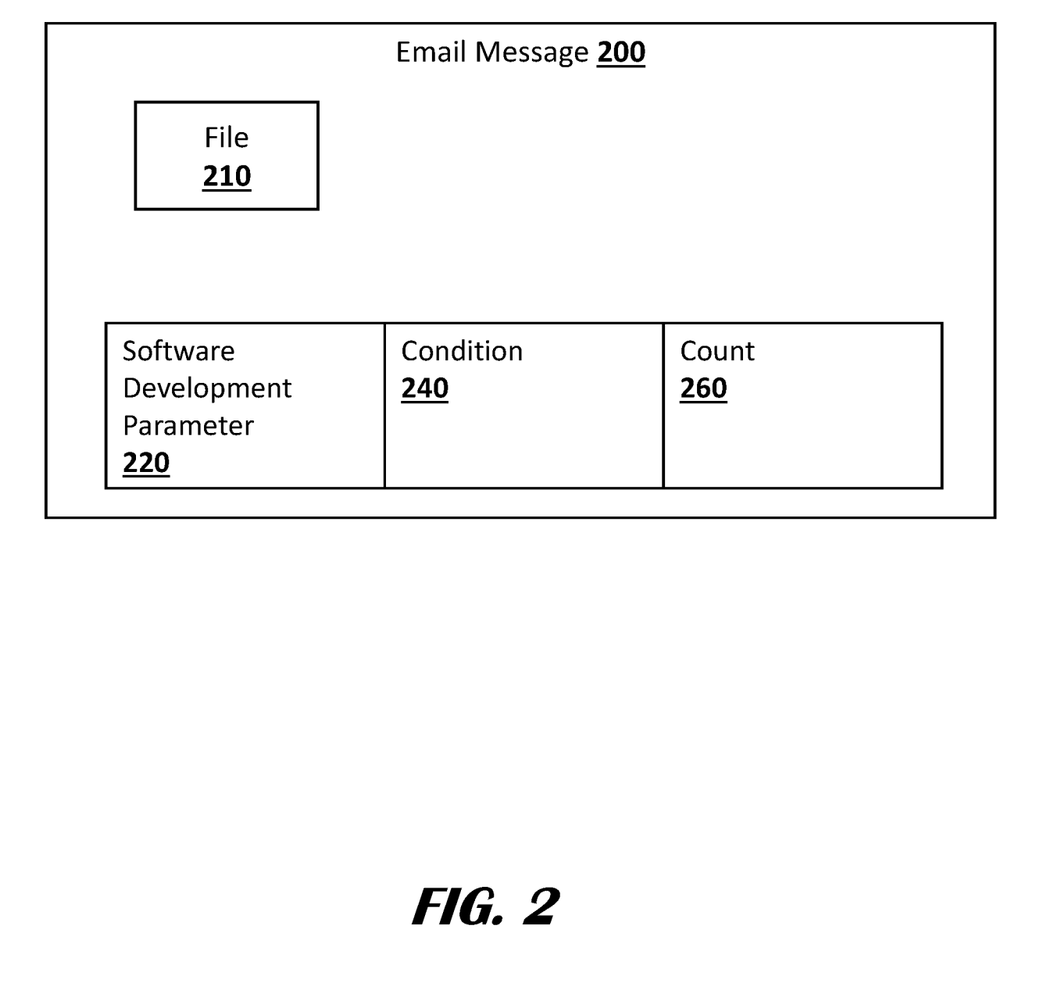
FIG. 2 illustrates an example email message generated based on extracted project requirements and testing results, in accordance with one or more embodiments.

FIG. 2 illustrates an example email message 200 generated based on extracted project requirements and testing results, in accordance with one or more embodiments. The email message 200 may be generated by CDE software programming (e.g., CDE 145 of FIG. 1B).

The email message 200 includes a software development parameter 220 and a count 260. The software development parameter 220 may be based on or correspond to a project requirement of the extracted project requirements. The software development parameter 220 may be a parameter of software being developed which is monitored and tracked. The software development parameter 220 may be a total number of unique projects. In another example, the software development parameter 220 is a total number of unique impacted consolidated software inventories (CSIs). The count 260 may be a number corresponding to the software development parameter. The count 260 may be based on the extracted testing results. The count 260 may be associated with the software development parameter based on the extracted project requirements and testing results. The count 260 may be a count of projects satisfying a project requirement.

The email message 200 may include a condition 240. The condition 240 indicates a condition of the software development parameter 220. The condition 240 may indicate a specific testing result associated with the software development parameter 220. In some implementations, the count 260 represents a number of projects or CSIs meeting the condition 240. In an example, the software development parameter 220 is a total number of unique projects on a release management list (RML) and the condition 240 is that a project number of each of the unique projects exists in the RML with a status of "yes." In another example, the software development parameter 220 is a total number or rate of unique projects with 100% regression covered at an impacted CSI App ID level, and the condition 240 is that each impacted CSI App ID tagged to the unique projects has at least one test case executed. In another example, the software development parameter 220 is total number of projects present as part of an RML that are 100% regression covered at the impacted CSI App ID level and the condition 240 is that each impacted CSI App ID tagged to the unique projects part of the RML has at least one test case executed. In another example, the software development parameter 220 is a total number or ratio of unique projects with 100% regression covered at a system impact analysis (SIA) level, and the condition 240 is that each impacted, connected, and support CSI App ID tagged to the unique projects has at least one test case executed. In another example, the software development parameter 220 is total number of projects present as part of an RML that are 100% regression covered at the SIA level and the condition 240 is that each impacted, connected, and support CSI App ID tagged to the unique projects part of the RML has at least one test case executed.

The software development parameter 220, the condition 240, and/or the count 260 may be dynamic. The software development parameter 220, the condition 240, and/or the count 260 may be dynamic content in the email message 200 and may be updated when the CDE 145 extracts the project requirements and the testing results. The software development parameter 220, the condition 240, and/or the count 260 may be updated at a frequency equal to or lower than a frequency at which the CDE 145 extracts the project requirements and the testing results. The software development parameter 220, the condition 240, and/or the count 260 may be updated at a same frequency or at different frequencies. Dynamically updating the software development parameter 220, the condition 240, and/or the count 260 may reduce a number of email messages sent and provide consistent location for monitoring progress of the software development. In some implementations, the email message 200 is sent to cloud storage, as discussed in FIGS. 1 and 2. In some implementations, the software development parameter 220, the condition 240, and/or the count 260 are updated in the cloud storage. In some implementations, a new email message is sent to the cloud storage each time the email message 200 is generated and/or each time the software development parameter 220, the condition 240, and/or the count 260 are updated.

The email message 200 may include a file 210. The file 210 may be attached to the email message 200. The file 210 may include the software development parameter 220, the condition 240, and/or the count 260. The file 210 may be a static file. The file 210 may provide a record of the software development parameter 220, the condition 240, and/or the count 260. The file 210 may allow for a zero-trust update of the software development parameter 220, the condition 240, and/or the count 260, as a developer cannot dynamically modify the file 210. In some implementations, the file 210 is sent to the cloud storage each time the software development parameter 220, the condition 240, and/or the count 260 are updated in the email message 200. The file 210 may serve as a backup to the email message 200 in the event the email message 200 is lost or deleted.

Figure 3:
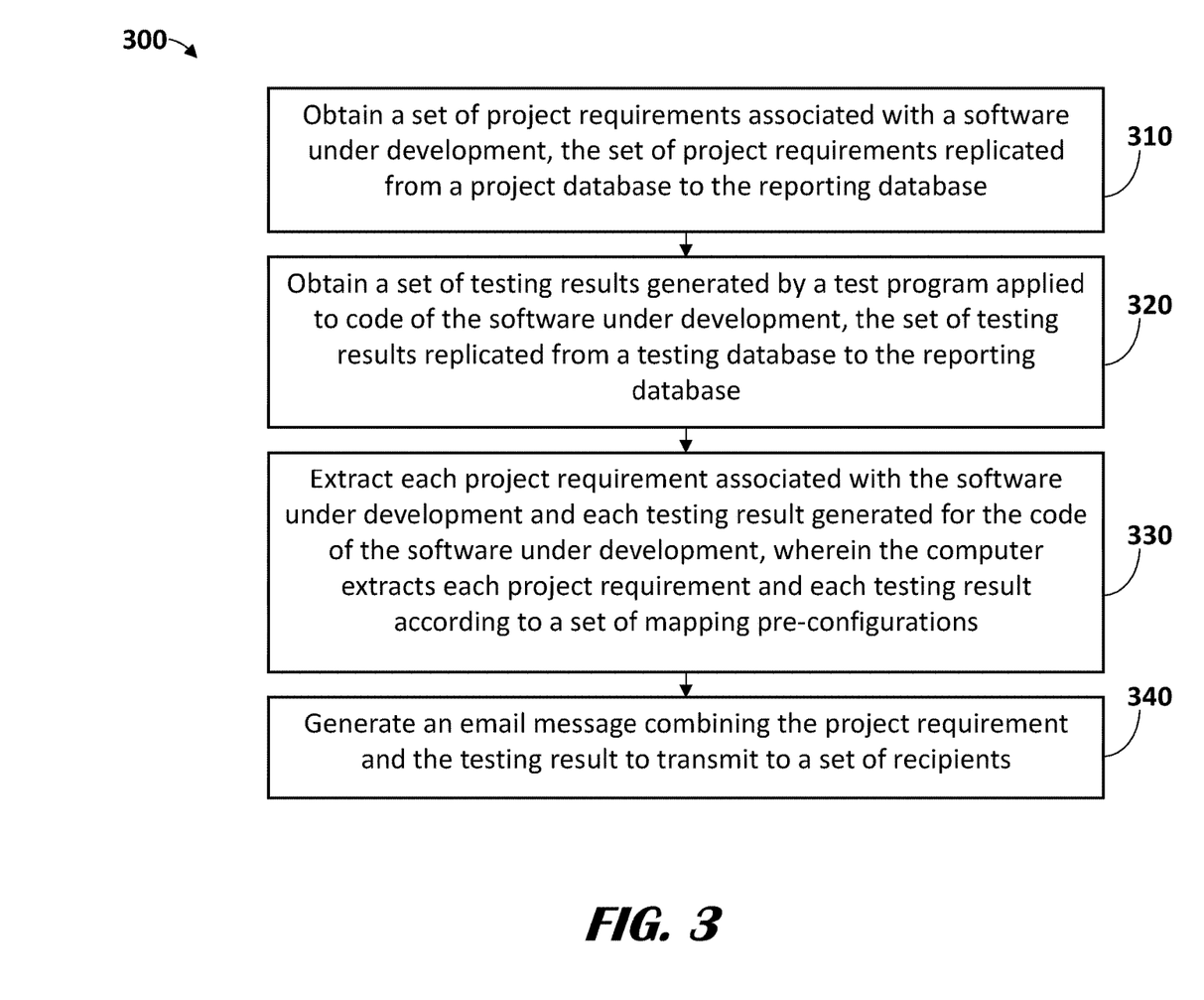
FIG. 3 is a flow chart illustrating operations of a method for generating evidence for software development requirements, in accordance with one or more embodiments.

FIG. 3 is a flow chart illustrating operations of a method 300 for generating evidence for software development requirements, in accordance with one or more embodiments. 300 For ease of description, the operations of the example method 300 are performed by a server of system executing or otherwise hosting CDE programming (e.g., CDE server 140 of FIG. 1A), but embodiments are not so limited. The operations, features, and functions of the method 300 may be performed any number of hardware and software components for software development and validation within a network environment or computing system. The method 300 may include more, fewer, or different operations than shown. The operations may be performed in the order shown, in a different order, or concurrently.

At operation 310, a set of project requirements associated with a software under development are obtained, the set of project requirements replicated from a project database to the reporting database. In some implementations, the set of project requirements are obtained in response to the set of project requirements being replicated from the project database to the reporting database. The set of project requirements may be replicated from the project database at a predetermined frequency. The set of project requirements may be obtained at a frequency equal to or lower than the predetermined frequency.

At operation 320, a set of testing results generated by a test program applied to code of the software-under-development are obtained, the set of testing results replicated from a testing database to the reporting database. In some implementations, the set of testing results are obtained in response to the set of testing results being replicated from the testing database to the reporting database. The set of testing results may be replicated from the testing database at a predetermined frequency. The set of testing results may be obtained at a frequency equal to or lower than the predetermined frequency. The set of testing results may be generated by a plurality of test programs applied to the code of the software under development. The plurality of test programs may each be associated with one or more project requirements of the set of project requirements.

At operation 330, each project requirement associated with the software under development and each testing result generated for the code of the software under development are extracted, where each project requirement and each testing result are extracted according to a set of mapping pre-configurations. The set of testing results may be generated by a plurality of test programs applied to the code of the software under development. The plurality of test programs may each be associated with one or more project requirements of the set of project requirements. The method may further include updating the set of mapping pre-configurations based on one or more updates to the plurality of test programs. The set of mapping pre-configurations may include parameters defining logic of the set of testing results and logic of the set of project requirements. The set of mapping pre-configurations may map the set of testing results to the set of project requirements based on the logic of the set of testing requirements and the logic of the set of project requirements.

At operation 340, an email message combining the project requirement and the testing result is generated to transmit to a set of recipients. The email message may be generated based on one or more parameters received from user input. The user input may modify an ETL logic of a CDE which generates the email message based on the ETL logic. The ETL logic may define the set of recipients.

The method 300 may further include updating a content of the email message with updated testing results. The content of the email message may be dynamic. Updating the content of the email message may include obtaining, from the reporting database, a set of updated testing results, extracting, from the reporting database, each updated testing result of the set of updated testing results, and updating the content of the email message with the updated testing results.

The method 300 may further include generating, based on the project requirement and the testing result, a report including the project requirement and the testing result. The report may be a static file. The method 300 may further include attaching the report to the email message. The report may be attached in the email message.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
   obtaining, by a computer from a reporting database, a set of project requirements associated with a software under development, the set of project requirements replicated from a project database to the reporting database, wherein each respective project requirement includes one or more project parameters for the software under development;
   obtaining, by the computer from the reporting database, a set of testing results generated by a test program applied to code of the software under development, the set of testing results replicated from a testing database to the reporting database;
   extracting, by the computer from the reporting database, each project requirement associated with the software under development and each testing result generated for the code of the software under development, wherein the computer extracts each respective project requirement and each respective testing result according to a set of mapping pre-configurations, wherein the set of mapping pre-configurations indicate the respective testing result is associated with a project parameter of the one or more project parameters of the respective project requirement; and
   generating, by the computer, an email message combining the project requirement and the testing result to transmit to a set of recipients.

2. The method of claim 1, further comprising updating, by the computer, a content of the email message with updated testing results.

3. The method of claim 2, wherein updating the content of the email message comprises:
   obtaining, by the computer from the reporting database a set of updated testing results;
   extracting, by the computer from the reporting database, each updated testing result of the set of updated testing results; and
   updating, by the computer, the content of the email message with the updated testing results.

4. The method of claim 1, further comprising:
   generating, based on the project requirement and the testing result, a report including the project requirement and the testing result; and
   attaching, by the computer, to the email message, the report.

5. The method of claim 1, wherein the set of testing results are generated by a plurality of test programs applied to the code of the software under development, wherein the plurality of test programs are each associated with one or more project requirements of the set of project requirements.

6. The method of claim 5, further comprising updating the set of mapping pre-configurations based on one or more updates to the plurality of test programs.

7. The method of claim 5, wherein the set of mapping pre-configurations are configured to convert, for each respective test program of the plurality of test programs, the testing results of the respective test program from a first format of the respective test program to a second format of the email message.

8. The method of claim 1, wherein generating the email message comprises generating a first version of the email message and a second version of the email message, wherein the second version includes less information than the first version.

9. The method of claim 8, further comprising sending the first version to a first subset of the set of recipients and sending the second version to a second subset of the set of recipients.

10. The method of claim 1, wherein generating the email message comprises generating the email message based on one or more parameters received, by the computer, in user input.

11. A system comprising:
- a processor; and
- a non-transitory, computer-readable medium comprising instructions which, when executed by the processor, cause the processor to:
  - obtain a set of project requirements associated with a software under development, the set of project requirements replicated from a project database to the reporting database, wherein each respective project requirement includes one or more project parameters for the software under development;
  - obtain a set of testing results generated by a test program applied to code of the software under development, the set of testing results replicated from a testing database to the reporting database;
  - extract each project requirement associated with the software under development and each testing result generated for the code of the software under development, wherein the computer extracts each respective project requirement and each respective testing result according to a set of mapping pre-configurations, wherein the set of mapping pre-configurations indicate the respective testing result is associated with a project parameter of the one or more project parameters of the respective project requirement; and
  - generate an email message combining the project requirement and the testing result to transmit to a set of recipients.

12. The system of claim 11, wherein the instructions further cause the processor to update a content of the email message with updated testing results.

13. The system of claim 12, wherein updating the content of the email message comprises:
- obtaining, by the computer from the reporting database a set of updated testing results;
- extracting, by the computer from the reporting database, each updated testing result of the set of updated testing results; and
- updating the content of the email message with the updated testing results.

14. The system of claim 11, wherein the instructions further cause the processor to:
- generate, based on the project requirement and the testing result, a report including the project requirement and the testing result; and
- attach to the email message, the report.

15. The system of claim 11, wherein the set of testing results are generated by a plurality of test programs applied to the code of the software under development, wherein the plurality of test programs are each associated with one or more project requirements of the set of project requirements.

16. The system of claim 15, wherein the instructions further cause the processor to update the set of mapping pre-configurations based on one or more updates to the plurality of test programs.

17. The system of claim 15, wherein the set of mapping pre-configurations are configured to convert, for each respective test program of the plurality of test programs, the testing results of the respective test program from a first format of the respective test program to a second format of the email message.

18. The system of claim 11, wherein generating the email message comprises generating a first version of the email message and a second version of the email message, wherein the second version includes less information than the first version.

19. The system of claim 18, wherein the instructions further cause the processor to send the first version to a first subset of the set of recipients and send the second version to a second subset of the set of recipients.

20. The system of claim 11, wherein generating the email message comprises generating the email message based on one or more parameters received in user input.

* * * * *